United States Patent [19]

Burke

[11] 4,149,946

[45] Apr. 17, 1979

[54] RECOVERY OF SPENT PICKLE LIQUOR AND IRON METAL

[75] Inventor: Zane L. Burke, Whittier, Calif.

[73] Assignee: Davis Walker Corporation, Los Angeles, Calif.

[21] Appl. No.: 888,527

[22] Filed: Mar. 21, 1978

[51] Int. Cl.² .................. C25C 1/06; B01D 13/02
[52] U.S. Cl. .................. 204/180 P; 204/48; 204/93; 204/104; 204/151
[58] Field of Search .................. 204/151, 180 P, 48, 204/93, 104

[56] References Cited

U.S. PATENT DOCUMENTS

| | | | |
|---|---|---|---|
| 3,470,044 | 9/1969 | Radimer | 204/151 X |
| 3,761,369 | 9/1973 | Tirrell | 204/151 |
| 3,764,503 | 10/1973 | Lancy et al. | 204/151 X |
| 3,788,959 | 1/1974 | Smith | 204/180 P |

Primary Examiner—Arthur C. Prescott
Attorney, Agent, or Firm—Christie, Parker & Hale

[57] ABSTRACT

Spent sulfuric acid pickle liquor containing ferrous ion is regenerated and iron metal is recovered therefrom by electrolysis in a cell having an anode in an anode chamber and a cathode in a cathode chamber separated by a cation-selective membrane. The spent pickle liquor is placed in the cathode chamber, aqueous ammonium sulfate solution is placed in the anode chamber, and electrical current is passed through the cell. Iron plates out on the cathode. Ammonium ion passes through the membrane into the cathode chamber to form aqueous ammonium sulfate solution therein, and the ammonium sulfate anolyte is converted to sulfuric acid solution useful for pickling. Ammonium sulfate solution from the cathode chamber is recycled to the anode chamber and the process is repeated with fresh spent pickle liquor.

15 Claims, 1 Drawing Figure

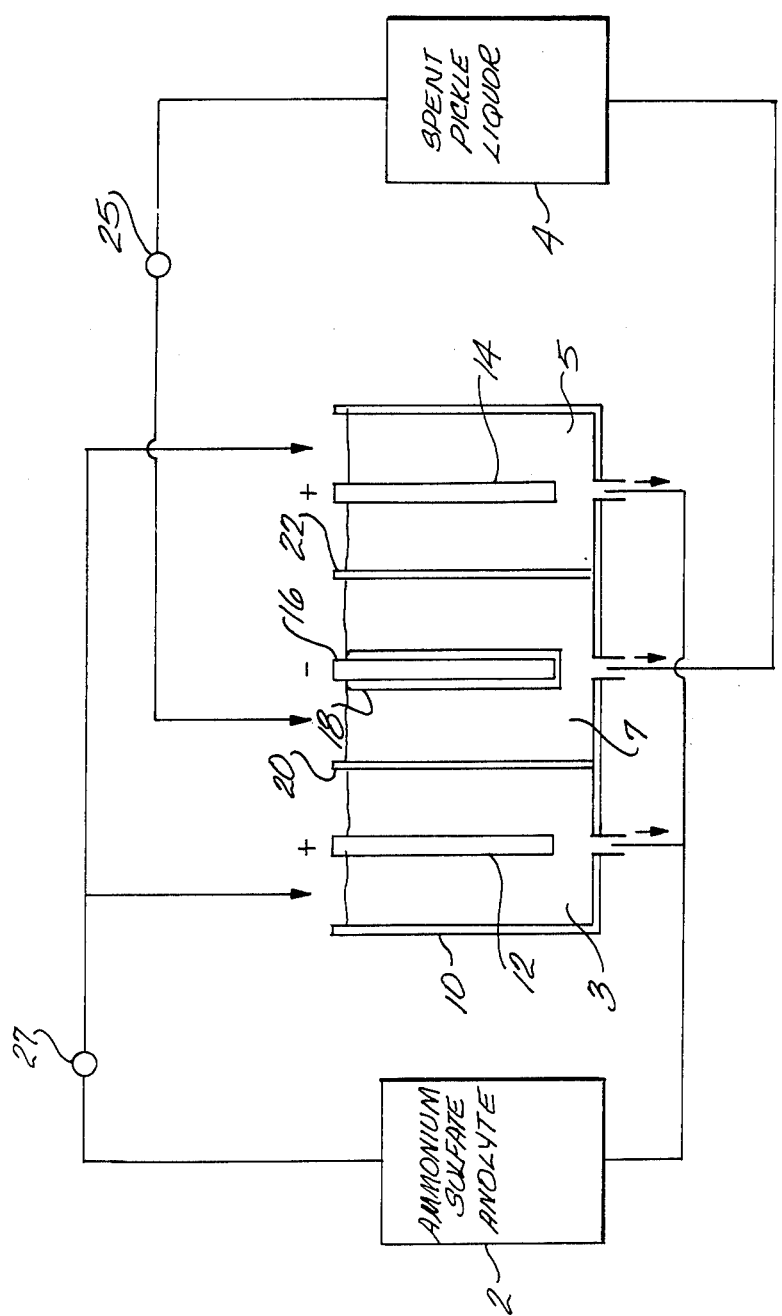

RECOVERY OF SPENT PICKLE LIQUOR AND IRON METAL

BACKGROUND

This invention relates to spent sulfuric acid pickle liquor which is obtained from the pickling or cleaning of iron and steel products and which contains sulfuric acid and dissolved ferrous sulfate. It relates to an electrolytic process of recovering metallic iron from such spent liquor and regenerating sulfuric acid which can be used in subsequent pickling operations.

When iron and steel products such as sheets, bands, or wires are descaled or pickled with sulfuric acid, iron dissolves in the sulfuric acid pickle liquor to form ferrous sulfate solution. With continued used, the free sulfuric acid content of the pickle liquor diminishes and the concentration of ferrous ion increases to a point where pickling no longer proceeds at a practical rate, at which point the pickle liquor is considered spent. The spent pickle liquor may contain on the order of 0.5 to 10 weight percent sulfuric acid and up to 10 weight percent or more of iron as ferrous sulfate. Practical methods for recovering both the sulfuric acid and the iron values of such spent pickle liquors are becoming increasingly desirable both for environmental and for economic reasons.

A number of processes are known for treating spent pickle liquor. One group of processes involve crystallization of ferrous sulfate heptahydrate from the solution by cooling and/or evaporative concentration of spent pickle liquor. Such processes consume large quantities of energy and yield the iron values in an undesirable form.

A number of electrolytic processes for regenerating sulfuric acid pickle liquor and recovering iron in metallic form have been described. U.S. Pat. No. 2,810,686 to Bodamer et al. describes a process employing a cell having an anionic permselective membrane in which spent pickle liquor is used as the catholyte and sulfuric acid is used as the anolyte. Iron plates out on the cathode and sulfate ions from the catholyte pass through the anion permeable membrane into the anode chamber to produce a more concentrated sulfuric acid anolyte useful for pickling. Unfortunately, currently available anion selective membranes have relatively short working lives and low current efficiencies under the severe conditions encountered in the regeneration of sulfuric acid pickle liquor.

U.S. Pat. No. 3,969,207 to Kerti et al. describes a process for the cyclic electrochemical processing of sulfuric acid pickle liquors, in which ammonium, magnesium or alkali metal sulfate is added to the spent pickle liquor. The liquor is then passed in series through the cathode chambers of a number of diaphragm cells, where iron plates out on the cathodes. Catholyte from the last cell is returned to the anode chamber of the first cell and passes in series through the anode chambers in parallel flow to the liquor.

Regenerated sulfuric acid pickle liquor is recovered as the anolyte from the last cell. The material of the diaphragms is preferably a dense polyester or polypropylene web. This process provides relatively low current efficiency on the order of 60 to 67 percent. The use of a series of cells and careful regulation and monitoring of flow rates and electrolyte levels are required. Moreover, because a simple porous diaphragm is used, the iron content of the regenerated pickle liquor cannot be reduced much below 7 grams of iron per liter without loss of efficiency and an increasing risk of turning the catholyte alkaline.

U.S. Pat. No. 3,072,545 to Juda et al. describes the use of a cell having an anode chamber, a central chamber, and a cathode chamber. A cation-selective membrane separates the central chamber from the anode chamber. A liquid permeable porous membrane separates the central chamber from the cathode chamber. Spent pickle liquor is the catholyte and sulfuric acid is the anolyte. During electrolysis iron plates out on the cathode, and hydrogen ion from the anolyte passes through the cation-selective membrane into the central chamber. A hydrostatic head is maintained in the catholyte chamber so that catholyte flows through the porous membrane into the central chamber at a rate that prevents diffusion of hydrogen ion into the catholyte chamber. Regenerated sulfuric acid is withdrawn from the central chamber. The cell is said to be 80 to 85 percent efficient both in recovering iron and in regenerating the acid. The process of this patent requires the pH of the catholyte to be monitored and adjusted as needed with an alkali such as ammonia, requires careful regulation of the catholyte level to maintain the required flow rate through the porous diaphragm, and is less efficient than might be desired.

Thus there is room for improvement in methods of regenerating sulfuric acid pickle liquor and recovering iron from such solutions. In particular it would be desirable to have a process which can be operated on a batchwise or continuous basis without constant monitoring and regulation of flow rates, levels, pH and the like.

SUMMARY OF THE INVENTION

The present invention provides a process for regenerating sulfuric acid pickle liquor that has been used for pickling or cleaning iron or steel articles and for recovering iron that dissolves in the pickle liquor as ferrous sulfate during use. In accordance with this invention, a direct electric current is passed through an electrolysis cell having an anode chamber and a cathode chamber separated by a cation-selective membrane preferably a fluorinated sulfonic acid membrane, such as a membrane of a hydrolyzed copolymer of a perfluorinated hydrocarbon and a fluorosulfonated perfluorovinyl ether. The anode chamber contains an anode in contact with an anolyte comprising ammonium sulfate solution. The cathode chamber contains a cathode in contact with a catholyte comprising sulfuric acid and ferrous sulfate solution. The current is continued for depositing iron metal on the cathode and for transporting ammonium ions from the anolyte to the catholyte. As the passage of current is continued, the anolyte is converted to sulfuric acid which can be used for further pickling, the catholyte is converted to ammonium sulfate solution which can be recycled for use as the anolyte, and much or substantially all of the ferrous ion in the catholyte is deposited on the cathode as iron metal.

BRIEF DESCRIPTION OF THE DRAWINGS

The sole FIGURE schematically illustrates an electrolysis cell and electrolyte circulating system useful in practice of this invention.

DETAILED DESCRIPTION

In practice of this invention, spent sulfuric acid pickle liquor containing dissolved ferrous ion is treated electroytically for regenerating the sulfuric acid and for recovering the ferrous ion content as iron metal. The spent pickle liquor is placed in the cathode chamber of an electrolysis cell having an anode chamber and a cathode chamber separated by a cation-selective membrane, and aqueous ammonium sulfate solution is placed in the anode chamber. Initially, the catholyte, i.e., the pickle liquor, may have a very low or negative pH. Ferrous ion does not plate out efficiently at very low pH. Thus, when current is first passed through the cell, hydrogen gas is evolved at the cathode. As the passage of current is continued, ammonium ions migrate through the cation-selective membrane from the anode chamber to the cathode chamber and the pH of the pickle liquor catholyte rises. When the pH of the catholyte rises to about 1.8, the evolution of hydrogen gas subsides, ferrous ions in the catholyte are reduced, and a deposit of iron metal forms on the cathode. So long as the catholyte contains an appreciable concentration of ferrous ion and the anolyte contains an appreciable concentration of ammonium ion, the pH of the catholyte remains within the range necessary for efficient deposition of iron, i.e., between about 2 and 4. Preferably, the pH is kept below about 3 to avoid localized precipitation of iron hydroxide near the membrane. As current continues to flow, iron metal is deposited on the cathode, the concentration of ferrous ion in the catholyte decreases, and the concentration of ammonium ion in the catholyte increases. The sulfate ion concentration of the catholyte remains substantially constant. The catholyte is thus substantially converted to a solution of ammonium sulfate which may contain sulfuric acid and a residual content of ferrous ion if the process is halted short of completion.

The anolyte is initially an aqueous solution of ammonium sulfate and contains ammonium ions and sulfate ions. The anolyte may also contain sulfuric acid. When current is passed through the cell, ammonium ions move from the anolyte to the catholyte through the cation-selective membrane. Oxygen gas and hydrogen ions are formed at the anode by electrolysis of water. As current continues to flow, the concentration of ammonium ion in the anolyte decreases, the concentration of hydrogen ion increases, and the concentration of sulfate ion remains substantially constant. The pH of the anolyte drops. Ammonium ions move through the membrane in preference to hydrogen ions, which remain in the anode chamber. In this way, the anolyte is substantially converted from a solution of ammonium sulfate to a solution of sulfuric acid. The sulfuric acid thus formed is the regenerated pickle liquor which is produced in accordance with practice of this invention. The regenerated pickle liquor may contain a residual content of ammonium ions, depending upon the extent to which the electrolysis is carried.

Membranes useful in the present invention are cation-permselective. That is, the membranes are highly permeable to cationic species such as the ammonium ion, but are relatively impermeable to anionic species such as the sulfate ion. The membranes are also relatively impermeable to the flow of liquids and this prevents mixing of the anolyte and catholyte. Membranes which are highly permeable to ammonium ions are preferred. Particularly preferred are membranes that can transport ammonium ion at an efficiency of at least about 0.60 grams per ampere hour, i.e., at an efficiency of at least about 90 percent of the theoretical electromotive equivalence of ammonium ion, which is 0.67 grams per ampere hour in the absence of a membrane. The membranes should also have resistance to chemical attack under the conditions herein contemplated. Cation-exchange membranes useful in practice of this invention are available commercially, and comprise an organic polymer containing pendant acid groups, notably sulfonic acid groups, which function as cation-exchange groups. The chemical structure of the polymer determines its resistance to chemical attack.

The primary criteria for selection of a suitable membrane are efficiency in transporting ammonium ions and resistance to chemical degradation. The ammonium ion transport property of a given membrane is best evaluated by testing under the contemplated conditions of actual use. Another criteria is mechanical strength.

Perfluorocarbon membranes having pendant sulfonic acid groups are highly preferred for use in practice of this invention because they are substantially inert to sulfuric acid and ammonium and ferrous sulfate solutions at temperature in excess of 100° C for long periods of time. Such membranes comprise thermoplastic copolymers of tetrafluoroethylene and a fluorosulfonated perfluorovinyl ether, such as perfluor-3,6-dioxa-4-methyl-7-octensulfonyl fluoride (hereinafter called PSEPVE). The copolymers are formed by melt fabricating techniques into continuous pinhole-free membranes. For mechanical strength and support, the membranes may be laminated with polytetrafluoroethylene cloth or mesh. Such copolymers and membranes and methods of making them are described in U.S. Pat. No. 3,282,875, especially Example XVII, U.S. Pat. No. 3,899,403, particularly column 5, line 51 through column 6, line 49, and U.S. Pat. No. 3,041,317, all of which patents are incorporated herein by this reference. Sulfostyrenated perfluorinated ethylene propylene polymer membranes, as described in said U.S. Pat. No. 3,899,403, column 7, line 34 through column 8, line 11, can also be used in practice of this invention. The membranes usually have a thickness, exclusive of supporting fabric, if any, of about 0.02 to 0.5 millimeter, preferably from about 0.1 to 0.3 millimeter. They may have equivalent weights of from about 500 to 4000, more usually 900 to 1,600, preferably 1,100 to 1,400 for strength, stability, good ion exchange selectivity, and low internal resistance.

Perfluorocarbon cation-exchange membranes are commercially available from E. I. Du Pont de Nemours & Company (Inc.) under the trademark "Nafion". Especially preferred for high efficiency and mechanical strength is Nafion 415, a supported membrane having a thickness exclusive of the supporting fabric of about 0.125 millimeter, an equivalent weight of about 1100, a cation-exchange capacity of 0.91 milliequivalents per gram of dry resin and a resistance of 1 to 4 ohms, typically 3.2 ohms, per square centimeter, depending upon the temperature and the solution in which the membrane is immersed. The equivalent weight is the weight of polymer in acid form which will neutralize one equivalent of base.

The anode may be made of any electrically conductive material that is sufficiently resistant to corrosion, such as lead alloyed with antimony, e.g., 6 percent antimony by weight of alloy. Similarly, the cathode material is corrosion resistant and may be made of a material to which deposited iron lead, not cling strongly. Useful cathode materials include stainless steel, lead lead antimony alloy, iron, aluminum, and carbon. Stainless steel is relatively light, strong, and corrosion resistant and deposited iron can be removed readily. Carbon cathodes are fragile but have the advantage of operating at lower initial voltage for a given current density. The use of a pure iron cathode is advantageous in that the deposited iron need not be removed from the cathode for recovery; instead, the entire cathode with its coating of deposited iron can be removed from the cell intact and can be used or sold as iron metal. The iron of the cathode is desirably at least as pure as the deposited iron.

Any spent sulfuric acid pickle liquor that has been used for pickling iron or steel and that contains dissolved ferrous ions can be regenerated in accordance with this invention. The spent liquor may comprise up to 300 grams per liter or more of total sulfate expressed as $H_2SO_4$. Substantially all of the sulfate may be present as ferrous sulfate if the pickle liquor is completely exhausted. However, because the rate of pickling decreases as the free acid content of the liquor is consumed, pickle liquor that is considered spent usually contains some free acid, on the order of 10 to 30 grams or more expressed as $H_2SO_4$. Spent liquor may contain widely varying amounts of iron. Typically, the iron content is in the range of about 80 to 120 grams of Fe per liter, but spent liquors containing more or less iron can also be treated in accordance with this invention.

In addition, pickle liquor that has been produced by regenerating spent pickle liquor in accordance with this invention may contain residual ammonium sulfate in amounts on the order of, for example, 10 to 20 grams per liter expressed as $NH_3$. Other substances such as impurities, metals from steel alloys, and the like, may also be present. Pickle liquor that has been exposed to oxidizing conditions may contain ferric ion. Any ferric ion present can be reduced to ferrous ion by contacting the pickle liquor with iron metal, such as scrap iron before regenerating the liquor. In usual practice, any small quantities of ferric ion present are reduced at the cathode without special treatment.

The anolyte before electrolysis comprises ammonium sulfate and may also comprise sulfuric acid. The total sulfate content is sufficient to provide pickle liquor of the desired strength when the anolyte is converted to sulfuric acid pickle liquor by electrolysis in accordance with this invention. The anolyte contains at least one electrochemical equivalent of ammonium ion per equivalent of ferrous ion to be recovered as iron metal from the spent pickle liquor. A slight excess of ammonium ion may be necessary to compensate for ammonium ion transported across the membrane during cell start up when hydrogen is evolved at the cathode before efficient iron deposition begins. The total sulfate content of the anolyte may be different from the total sulfate content of the catholyte. In a balanced system where pickle liquor is used, regenerated, and reused, the total sulfate contents of catholyte and anolyte are ordinarily about the same, and the ammonium ion content of the anolyte is at least electrochemically equivalent to the ferrous ion content plus the ammonium ion content of the catholyte.

The concentration of sulfate in the starting anolyte is lower than the concentration of sulfate in the final anolyte, i.e., the regenerated sulfuric acid, because during electrolysis water is transported across the membrane from the anode chamber to the cathode chamber.

The rate of water transport depends upon a number of factors such as the nature of the membrane, the anolyte and catholyte concentrations, the temperature, and the current density. The rate of water transport encountered under a given set of conditions is easily determined and compensated for so that when electrolysis is ended, the regenerated sulfuric acid in the anode chamber has the desired concentration.

The transported water progressively dilutes the catholyte, but when the final catholyte is reused as starting anolyte, the transported water is removed and the anolyte concentration rises to the desired level. Thus, the transported water stays in the cell circuit and does not deleteriously affect the concentration of the regenerated sulfuric acid. Similarly, the transported ammonia stays in the cell circuit and does not build up above residual levels in the regenerated sulfuric acid, even when the pickle liquor is repeatedly recycled between the pickle tanks and the regeneration cells.

Electrolysis is continued until the sulfuric acid content of the anolyte reaches the desired level. Desirably, the ammonium ion content of the anolyte and the ferrous ion content of the catholyte are at least about equivalent, so that by the time the anolyte has been regenerated substantially all of the ferrous ion is deposited as iron metal. When the ammonium ion is in excess, for example when the iron content of the spent pickle liquor is low, electrolysis is continued beyond the time necessary for complete deposition of iron to transport the required amount of ammonium ion across the membrane. After the iron content of the catholyte is depleted, hydrogen is evolved at the cathode until electrolysis is terminated. When ferrous ion is in excess, it is not possible to recover substantially all of the iron from solution.

The process of this invention may be practiced at any convenient temperature and pressure. Any temperature between the freezing points and boiling points of the electrolytes may be used. However, current efficiency is low at very low temperatures and electrolyte evaporation is high at very high temperatures. Temperatures ordinarily employed in pickling tanks, which range from about 50° to 70° C, are preferred both for efficiency and convenience. The process may be practiced at ambient pressures. Higher pressures may reduce the evaporation of water from the electrolytes. Lower pressures may also be used.

The primary purpose of the process of this invention is to regenerate spent pickle liquor, while the recovery of iron is an added benefit that renders the process more economically attractive. Therefore, the current density at the membrane is preferably selected to provide optimal current efficiency in the transport of ammonium ion rather than the optimal current efficiency in deposition of iron on the cathode, because the conversion of anolyte to regenerated pickle liquor is accomplished by removal of ammonium ion across the membrane. The following example illustrates how the desired membrane current density can be found.

EXAMPLE 1

A three chambered electrolytic cell having a central cathode chamber between two anode chambers was constructed. A Nafion 415 cation exchange membrane measuring 4.5 inches square separated each anode chamber from the cathode chamber, providing a total membrane area of 40.5 square inches. Anodes were of 6% antimony lead. The cathode was a plate of 316 stainless steel measuring 3.6 inches by 4 inches, providing a total working area (both sides) of 28.8 square inches. The electrodes were spaced 2¼ inches apart.

Two liters of a catholyte containing 109.35 grams per liter (g/l) of ferrous ion expressed as Fe, 247.9 g/l total sulfate expressed as $H_2SO_4$ and 15.0 g/l ammonium ion expressed as $NH_3$, and two liters of an anolyte containing 247.9 g/l total sulfate expressed as $H_2SO_4$ and 85.0 g/l ammonium ion expressed as $NH_3$ were circulated through the cathode and anode chambers and electrolyzed at 50° C to an endpoint corresponding to the transport of about 70 to 75 g/l of ammonium ion expressed as $NH_3$ through the membranes and substantially complete deposition of iron. The starting anolyte also contained additional water not reflected in the concentration figures given above to compensate for water transported through the membrane during electrolysis. Three runs were conducted at different membrane current densities. The current efficiency of ammonium ion transport and the relative energy costs of iron deposition and acid regeneration for each run are reported in Table 1. The current efficiency is calculated by dividing the weight per liter of $NH_3$ transported by the electromotive equivalent of ammonium ion, 0.67 grams per ampere hour, and expressing the result as a percentage of the actual ampere hours consumed per liter of acid regenerated.

TABLE 1

Current Efficiency for Ammonium Ion Transport vs. Membrane Current Density, Nafion 415 Membrane

|  | Run 1 | Run 2 | Run 3 |
|---|---|---|---|
| Membrane Current Density, amp/ft$^2$ | 32.15 | 64.3 | 128.6 |
| Hours to Completion | 28 | 12 | 12 |
| NH$_3$ in final anolyte, g/l | 15 | 9.6 | 10.5 |
| Ampere Hours per Liter | 126 | 108 | 216 |
| Current Efficiency, % | 82.5 | 96.27 | 48.14 |
| Watt Hours per Liter | 466.2 | 501.3 | 1404 |
| Kilowatt Hours per Kilogram of Iron Deposited | 4.26 | 4.58 | 12.8 |

The conditions of Run 2 are clearly preferable. Even though the energy consumption in Run 2 is a little higher than in Run 1 (501.3 watt hours vs. 466.2 watt hours), the current efficiency is so much higher that the run was completed in a much shorter time (12 hours vs. 28 hours). In Run 2, water was transported across the membranes at the rate of 117.77 milliliters per square foot per hour.

The exceptionally high current efficiency achievable in practice of this invention is illustrated by the data in Table 2, which was obtained by monitoring the temperature of the above described cell during a test run at a membrane current density of 64.3 amps per square foot, corresponding to Run 2.

TABLE 2

Cell Temperature vs. Time, Membrane Current Density 64.3 Amp/ft$^2$

| Time, hours | Ambient Temperature, ° C. | Cell Temperature, ° C. |
|---|---|---|
| 0 | 22 | 22 |
| 1 | 25 | 32 |
| 2 | 27 | 37 |
| 3 | 29.5 | 39.5 |
| 4 | 30.5 | 39.5 |
| 5 | 30 | 39.5 |
| 6 | 31 | 40 |
| 7 | 30 | 39.5 |
| 8 | 26 | 38 |
| 9 | 25 | 36.5 |
| 10 | 25 | 36 |
| 11 | 23 | 35 |

The very low heat rise observed is a clear demonstration of the excellent efficiency of the present process.

The iron that plates out on the cathode is highly cystalline and forms a smooth, laminar deposit. It is believed that the nature of the deposit can be affected both by the cell voltage and by the current density at the cathode. The cathode material affects the cell voltage, at least initially. The cathode surface area determines the cathode current density when the total current is kept constant. In Example 1, Run 2, the area of the stainless steel cathode was selected to provide a cathode current density of 90 amps per square foot, a figure that was found to provide a smooth deposit of iron free of dendritic or nodular defects.

A variety of cell designs may be used. Any acid-resistant material of construction, such as plastic or fiberglass, can be used. The simplest cell includes an anode chamber and a cathode chamber separated by a cation-selective membrane. Another design is illustrated in the FIGURE wherein an electrolytic cell 10 has a central cathode chamber 7 having a cathode 16 between two anode chamber 3 and 5 having anodes 12 and 14 respectively. Cation-selective membranes 20 and 22 separate the anode chambers from the cathode chamber. A catholyte reservoir 4 contains spent pickle liquor which is circulated with a pump 25 through the cathode chamber. An anolyte reservoir 2 contains ammonium sulfate anolyte which is circulated through the two anode chambers with a pump 27. A coating of deposited iron 18 is shown on the cathode. A number of such cells can be connected in series or in parallel both electrically and hydraulically. This type of cell makes use of both sides of the cathode. It can be modified to include a plurality of anode chambers and a plurality of cathode chambers arranged in alternating succession, each pair of adjacent chambers being separated by a cation-selective membrane. In such a cell both sides of each electrode except the end electrodes are used, and the number of anodes required is smaller than the number required in a series of three-chambered cells having the same number of cathodes.

In an embodiment of the invention, a plurality of cells are used. Spent pickle liquor containing dissolved ferrous sulfate and dissolved ammonium sulfate is continuously introduced into the cathode chamber of the first cell and is passed in series through the cathode chambers to the cathode chamber of the last cell. Catholyte from the last cell is continuously transferred to the anode chamber of the first cell and is passed in series through the anode chambers to the last cell. Regenerated sulfuric acid solution is continuously withdrawn from the anode chamber of the last cell.

In another embodiment, a three-chamber cell of the kind shown in the FIGURE is employed without the auxiliary tanks and circulating pumps. Rather, the cell chambers are large enough to accommodate all of the pickle liquor to be regenerated.

The present invention has been described with reference to particular details and embodiments thereof which are intended to illustrate the invention. Numerous variations of the invention may be made within the scope of the following claims.

What is claimed is:

1. A process for regenerating spent sulfuric acid pickle liquor and recovering iron therefrom, which comprises;

introducing an aqueous catholyte containing dissolved ferrous sulfate into the cathode chamber of an electrolytic cell having a cathode in a cathode chamber, an anode in an anode chamber, and a cation-selective membrane separating the anode and cathode chambers;

introducing an aqueous anolyte containing dissolved ammonium sulfate into the anode chamber of the cell;

passing a direct electric current through the cell for depositing iron metal on the cathode and for transporting ammonium ion from the anolyte through the membrane into the catholyte, whereby the sulfuric acid content of the anolyte is increased and the ammonium sulfate content of the catholyte is increased; and withdrawing anolyte having an increased sulfuric acid content from the anode chamber.

2. The process of claim 1 wherein the membrane is formed of a perfluorocarbon polymer having pendant sulfonic acid groups.

3. The process of claim 2 wherein the membrane can transport ammonium ion with an efficiency of at least about 0.6 grams of ammonium ion per ampere hour of current passing through the membrane.

4. The process of claim 2 wherein the polymer is a copolymer of tetrafluoroethylene and a perfluorocarbon vinyl ether having a sulfonyl functional group.

5. The process of claim 1 wherein the total sulfate content of the anolyte and the total sulfate content of the catholyte are about equal.

6. The process of claim 1 wherein the ammonium ion content of the anolyte is at least electrochemically equivalent to the ferrous ion content of the catholyte.

7. A cyclic process for regenerating spent sulfuric acid pickle liquor and for recovering iron metal therefrom, which comprises:

introducing spent sulfuric acid pickle liquor containing dissolved ferrous sulfate as catholyte into the cathode chamber of an electrolytic cell having a cathode in a cathode chamber, an anode in an anode chamber, and a cation-selective membrane separating the anode and cathode chambers;

introducing an aqueous anolyte containing dissolved ammonium sulfate into the anode chamber of the cell;

passing a direct electric current through the cell for depositing iron metal on the cathode and for transporting ammonium ion from the anolyte through the membrane into the catholyte, whereby the anolyte is substantially converted to regenerated sulfuric acid solution and the catholyte is substantially converted to ammonium sulfate solution;

withdrawing regenerated sulfuric acid solution from the anode chamber;

transferring catholyte from the cathode chamber to the anode chamber; and introducing spent sulfuric acid pickle liquor containing dissolved ferrous sulfate into the cathode chamber.

8. The process of claim 7 wherein the membrane is formed of a perfluorocarbon polymer having pendant sulfonic acid groups.

9. The process of claim 8 wherein the membrane can transport ammonium ion with an efficiency of at least about 0.6 grams of ammonium ion per ampere hour of current passing through the membrane.

10. The process of claim 8 wherein the polymer is a copolymer of tetrafluoroethylene and a perfluorocarbon vinyl ether having a sulfonyl functional group.

11. The process of claim 7 wherein the ammonium ion content of the anolyte is at least electrochemically equivalent to the ferrous ion content of the catholyte.

12. A process for regenerating spent sulfuric acid pickle liquor and for recovering iron metal therefrom, which comprises:

introducing spent sulfuric acid pickle liquor containing dissolved ferrous sulfate and dissolved ammonium sulfate as catholyte into the cathode chamber of an electrolytic cell having a cathode in a cathode chamber, an anode in an anode chamber, and a perfluorocarbon cation-selective membrane having pendant sulfonic acid groups separating the anode and cathode chambers;

introducing an aqueous anolyte containing dissolved ammonium sulfate into the anode chamber of the cell, the ammonium ion content of the anolyte being at least electrochemically equivalent to the ferrous ion content plus the ammonium ion content of the catholyte;

the total sulfate content of the anolyte being about equal to the total sulfate content of the catholyte;

passing a direct electric current through the cell for depositing iron metal on the cathode and for transporting ammonium ion from the anolyte through the membrane into the catholyte;

continuing the passage of current until the ammonium ion content of the anolyte is lowered to about the ammonium ion content of the spent sulfuric acid pickle liquor as introduced into the cathode chamber, whereby the anolyte is substantially converted to regenerated sulfuric acid solution;

withdrawing regenerated sulfuric acid solution from the anode chamber; and transferring catholyte from the cathode chamber to the anode chamber.

13. The process of claim 12 wherein the membrane can transport ammonium ion with an efficiency of at least about 0.6 grams per ampere hour of current passing through the membrane.

14. The process of claim 13 wherein the polymer is a copolymer of tetrafluoroethylene and a perfluorocarbon vinyl ether having a sulfonyl functional group.

15. The process of claim 12 wherein a plurality of such electrolytic cells including a first cell and a last cell are employed, and which comprises the steps of:

continuously introducing spent sulfuric acid pickle as catholyte liquor into the cathode chamber of the first cell;

passing the catholyte in series through the cathode chambers of the cells;

continuously transferring catholyte from the last cell to the anode chamber of the first cell as anolyte;

passing the anolyte in series through the anode chambers of the cells; and continuously withdrawing regenerated sulfuric acid solution from the anode chamber of the last cell.

* * * * *